United States Patent
Vadekeetil (10) Patent No.: US 11,241,925 B2
(45) Date of Patent: Feb. 8, 2022

(54) BATTERY OPERATED FLYING CAR WITH ENCLOSED MOTORS FOR HUMAN TRANSPORTATION

(71) Applicant: Biju Philips Vadekeetil, Plano, TX (US)

(72) Inventor: Biju Philips Vadekeetil, Plano, TX (US)

( * ) Notice: Subject to any disclaimer, the term of this patent is extended or adjusted under 35 U.S.C. 154(b) by 665 days.

(21) Appl. No.: 16/199,024

(22) Filed: Nov. 23, 2018

(65) Prior Publication Data

US 2020/0164705 A1    May 28, 2020

(51) Int. Cl.
| | |
|---|---|
| *B60F 5/02* | (2006.01) |
| *B60R 19/52* | (2006.01) |
| *B60K 1/02* | (2006.01) |
| *B64C 37/00* | (2006.01) |

(52) U.S. Cl.
CPC .................. *B60F 5/02* (2013.01); *B60K 1/02* (2013.01); *B60R 19/52* (2013.01); *B64C 37/00* (2013.01)

(58) Field of Classification Search
CPC ........... B60F 5/02; B64C 37/00; B60R 19/52; B60K 1/02
See application file for complete search history.

(56) References Cited

U.S. PATENT DOCUMENTS

| | | | | |
|---|---|---|---|---|
| 3,276,528 | A * | 10/1966 | Tucknott | B64C 27/20 180/119 |
| 4,043,421 | A * | 8/1977 | Smith | B64C 27/20 180/117 |
| 5,141,173 | A * | 8/1992 | Lay | B64C 37/00 244/2 |
| 5,860,620 | A * | 1/1999 | Wainfan | B60V 1/22 244/12.1 |
| 6,745,977 | B1 * | 6/2004 | Long | B60F 5/02 244/17.25 |

* cited by examiner

*Primary Examiner* — Richard R. Green
*Assistant Examiner* — Steven J Shur
(74) *Attorney, Agent, or Firm* — Law Office of Jeff Williams PLLC; J. Oliver Williams (57) ABSTRACT

"Battery operated flying car with enclosed motors for human transportation" is machine that can carry humans and looks like a real flying car. The current problem with implementing this is resolved by using ducted motors with grilles around it. By covering top and bottom of car with grilles we are able to negate effect of completely covered motors. By providing grilles around motors we ensure safety of humans around it, this not only avoids direct contact but also provides continuous air flow into motors to push out from the other side. Loss of efficiency due to covered grilles are countered by use of two additional front and two rear motors. Vertically mounted front motors push air into bottom motors which significantly improves the lift capacity of the flying car. Vertically mounted rear motor pumps air out of the car and thus aids in forward movement of the flying car.

5 Claims, 7 Drawing Sheets

BATTERY OPERATED FLYING CAR WITH ENCLOSED MOTORS FOR HUMAN TRANSPORTATION

BACKGROUND

Example embodiments in general relate to flying cars and more specifically it relates to a battery operated flying car with enclosed motors for human transportation. There are many battery powered flying machines currently being worked on but all of them suffer from the below problems:
   (a) Too many complicated visible moving parts.
   (b) Rotating parts are exposed that can hurt people.
   (c) Most of them look like a different version of a drone quadcopter or helicopter.
   (d) Most of them are not practical for mass consumption.
   (e) Not what the world is looking for when they think of a flying car.

SUMMARY

To have a flying car that can be sold to the masses we need a flying car that is more practical, safer to fly, safer for the people around it and looks like a car. Many have tried to solve this by completely covering the motors to have a completely covered car, the problem with this approach is that when you completely cover a motor there is no air coming in to push the air out. For a motorized flying car lift and propulsion is based on pushing air out.

This problem is solved by not fully covering the motors, instead by using ducted motors with grilles around it and covering the top and bottom of the car with grilles we are able to negate the effect of completely covering the motors. By providing grilles around the motors we ensure the safety of humans around it, cover the motors from direct contact but at the same time provide continuous air into the motors to push out from the other side. There will be a loss in efficiency by the partly covered motors, this loss in efficiency is being countered by the use of two additional front and two rear motors. The vertically mounted front motors push air into the bottom motors which significantly improves the lift capacity of the flying car. The vertically mounted rear motor pumps air out of the car and thus aids in the forward movement of the flying car.

An example embodiment of the present invention is directed to a flying car which includes the four bottom motors to provide thrust, the two front motors to push air into the fuselage, the two rear motors for forward and backward movement in the air, the airframe to support all the components, the battery to provide power, the duct work to move air, the passenger cabin with the console and the avionics.

There has thus been outlined, rather broadly, some of the features of the battery operated flying car with enclosed motors for human transportation in order that the detailed description thereof may be better understood, and in order that the present contribution to the art may be better appreciated. There are additional features of the battery operated flying car with enclosed motors for human transportation that will be described hereinafter and that will form the subject matter of the claims appended hereto. In this respect, before explaining at least one embodiment of the battery operated flying car with enclosed motors for human transportation in detail, it is to be understood that the battery operated flying car with enclosed motors for human transportation is not limited in its application to the details of construction or to the arrangements of the components set forth in the following description or illustrated in the drawings. The battery operated flying car with enclosed motors for human transportation is capable of other embodiments and of being practiced and carried out in various ways. Also, it is to be understood that the phraseology and terminology employed herein are for the purpose of the description and should not be regarded as limiting.

One object is to provide a battery operated flying car with enclosed motors for human transportation that can carry human beings by making it safer to fly without exposed motors by enclosing the motors in a ducted grille covering.

Another object is to provide a Battery operated flying car with enclosed motors for human transportation that looks closer to a real car and not like a drone, quadcopter or a helicopter.

Another object is to provide a Battery operated flying car with enclosed motors for human transportation that has four horizontally motors on the bottom of the car pushing air downwards to the ground for providing lift.

Another object is to provide a Battery operated flying car with enclosed motors for human transportation that provides forward and backward motion through vertically mounted front and rear motors.

Other objects and advantages of the various embodiments of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 1 is a top view of the design for the present invention. This figure clearly shows how the different components are laid out in this design. It shows how the motors should be placed and how they are expected to be covered with grilles to achieve the desired results. The key components have been clearly marked to identify the covered bottom motors and the covered front and rear motors.

FIG. 3 shows the bottom design of the present invention. This view shows the airframe that supports the 8 motors and the battery bay. The passenger cabin would be attached on top of the airframe.

FIG. 4 The design in this invention can be used with different body styles, one of the proposed body style of the flying car is shown in FIG. 4. It shows the front three quarter view of the car, showing the front motors at the two ends. The air intake grills in the front help suck in air and push it to the rear ducts in the car helping to propel the car forward.

DETAILED DESCRIPTION

A. Overview

Figure 1:
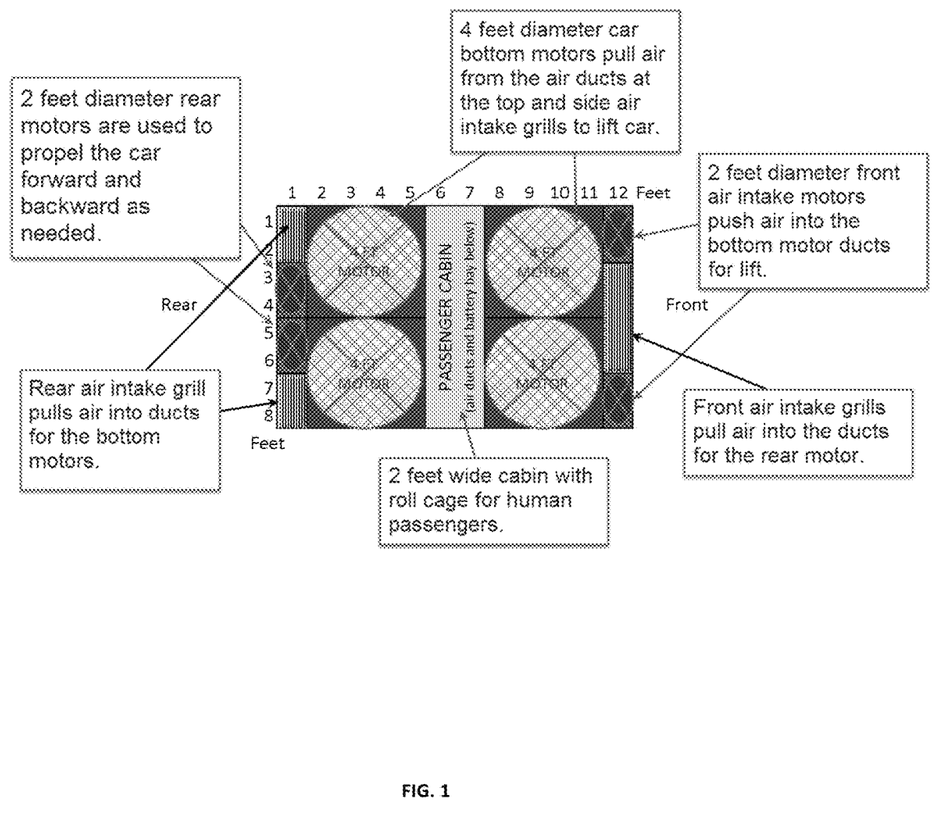
Figure 2:
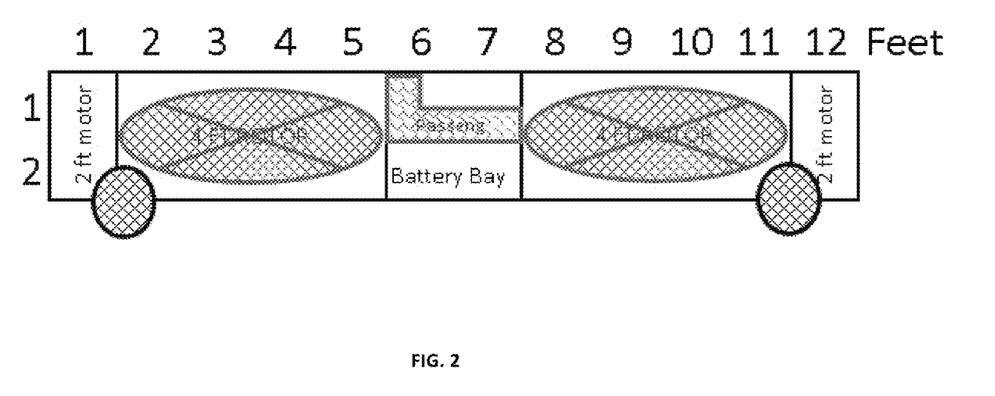
FIG. 2 is a side view of the design of the present invention. This technical side view shows the key components when viewed from the side of the flying car.
Figure 3:
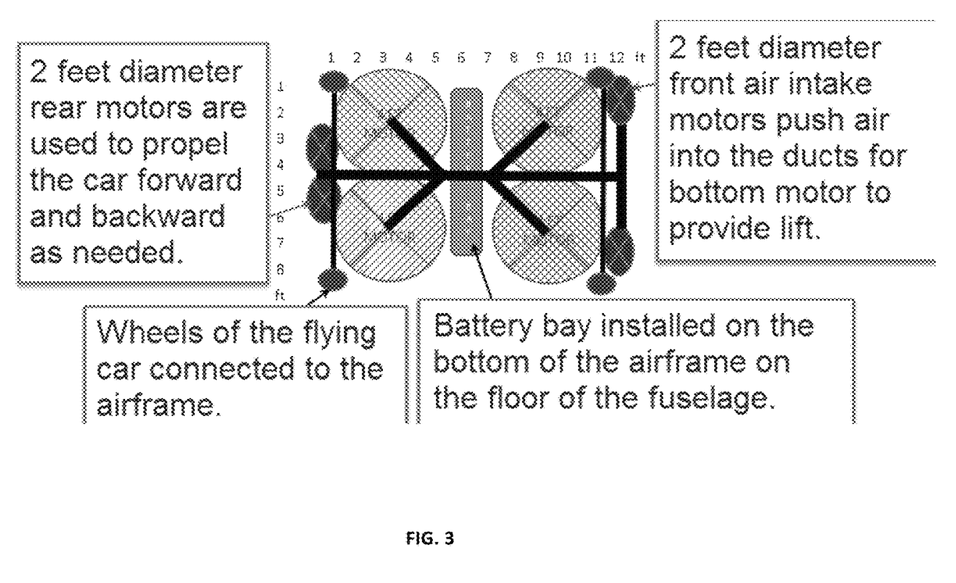
Figure 4:
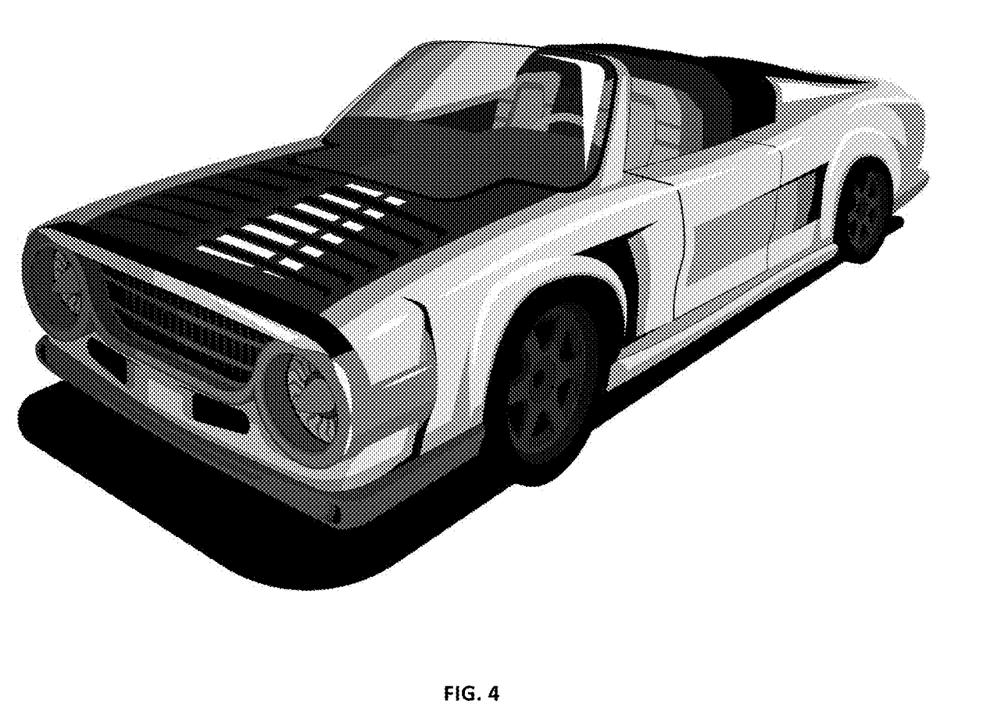
Figure 5:
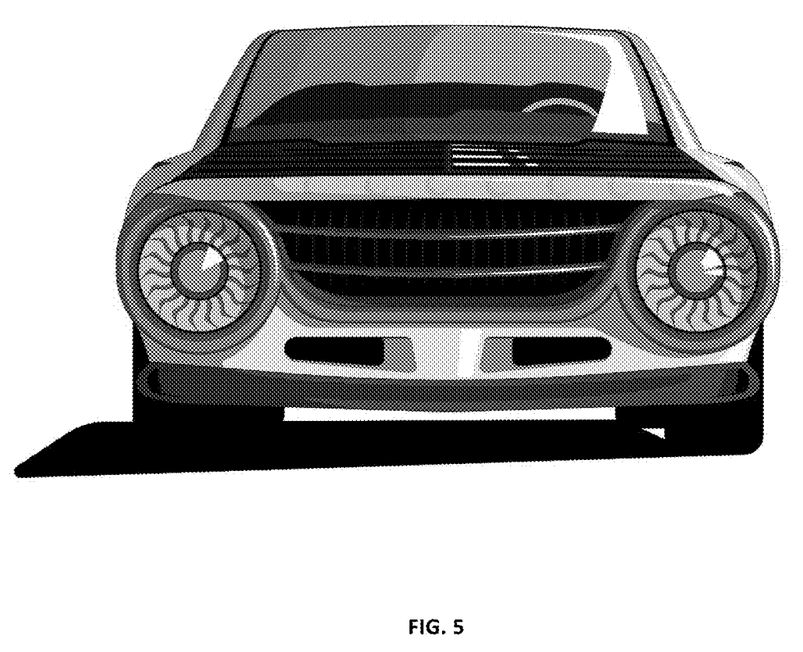
FIG. 5 is another view of a proposed body style with the design in this invention. It is a front view of the flying car body showing the front motors and the grilles for air intake to pull air into the rear motors. The front motors push air into the bottom motors for vertical lift.
Figure 6:
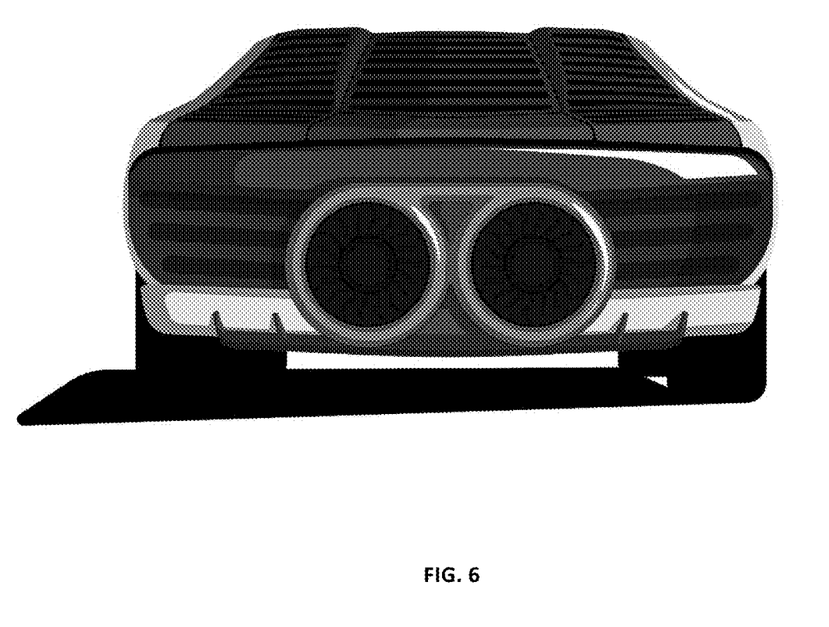
FIG. 6 shows a potential look for the rear of the flying car using the design in this invention. It shows the rear motors that are used to move the car forward or backward as needed. The air into the motors come from the front air intake grille.
Figure 7:
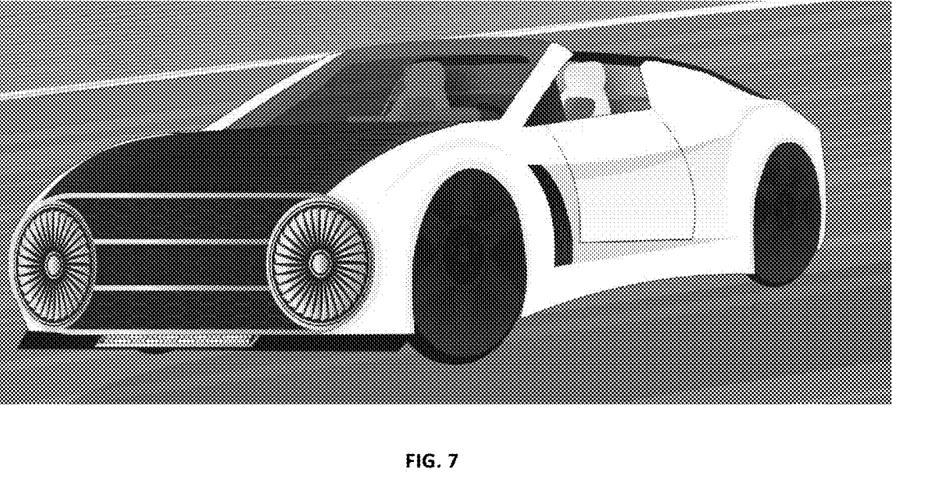
FIG. 7 shows an alternate look for the body of the flying car using the design in this invention. The basic concept remains the same, this view shows that different exterior shells can be designed and implemented on top of the airframe by using the design in this invention.

The key part of the invention is enclosing the motors and propellers in within safety cages to allow the flow of air in and out of the motors but at the same time reduce human injury from exposed propellers and compensating for loss of air intake by providing front and/or rear motors also enclosed in cages.

Turning now descriptively to the drawings, in which similar reference characters denote similar elements throughout the several views, the figures illustrate an example embodiment comprising the four bottom motors to provide thrust, the two front motors to push air into the fuselage, the two rear motors for forward and backward movement in the air, the airframe to support all the components, the battery to provide power, the duct work to supply air, the passenger cabin with the console, the avionics and the complete framework enclosed within a covered body with grilles for air passage preventing injury to humans.

B. Bottom Motors

There should be four motors in the bottom of the car, mounted on top of the airframe. The motors should be configured to pull air from the top and push it downwards to provide lift for the flying car. Each of the motor is a heavy lift brushless motor. Each of the motor propeller combination is enclosed with grille covers to prevent injury to humans.

C. Front Motors

The front motors pull outside air and push into the flying car so that the bottom motors have enough air to push down for thrust. Each of the motor is a heavy lift brushless motor. Each of the motor propeller combination is enclosed with grille covers to prevent injury to humans.

D. Rear Motors

The rear motors pull air from the front of the car and push it out of the rear of the car there by providing forward thrust for the car to move forward in the air. Each of the motor is a heavy lift brushless motor. Each of the motor propeller combination is enclosed with grille covers to prevent injury to humans.

E. Airframe

The airframe is the core structure to which all the load is attached. The airframe connects all the motors, the battery bay, passenger cabin and the wheels together. The air frame should be made of ultra-light high strength materials like carbon composite. Carbon composite high strength airframe rated for 1,000 lbs. of load.

F. Battery

The flying car will be powered by a battery power source similar to lithium or other power storage options. The batteries will be mounted on battery bay attached to the airframe and protects the passengers in the cabin above with a firewall in between.

G. Duct Work

Air ducts will be used to isolate and channel the air from the front of the car to the bottom motors and the rear motors. Low weight Aluminum or plastic duct work.

H. Passenger Cabin

The passenger cabin will be attached to the airframe and be above the battery bay insulated by a firewall to protect the passengers in case of fire in the battery. Futuristic looking passenger cabin with touch sensitive LCD screens for console, throttle for takeoff and landing control. Multi directional Joy stick for Forward, backward, left and right controls. The passenger cabin can be configured for one or more passengers.

I. Avionics

The avionics includes the flight controller, the electronic speed controller for the motors, the power control board for the batteries, the gyros for the 8 axis stabilizers. The avionics will control the flight, stability and power distribution to the motors.

J. Connections of Main Elements and Sub-Elements of Invention

All of the Avionics are controlled from the passenger cabin.

K. Alternative Embodiments of Invention

The key part of the invention is enclosing the motors and propellers in within safety cages to allow the flow of air in and out of the motors but at the same time reduce human injury from exposed propellers and compensating for loss of air intake by providing front and/or rear motors also enclosed in cages. Provided below are variations of applying this invention.

Variation 1: Flying car with four bottom, two front and two rear motors. The car body to have air intake grilles all over to maximize air availability for the bottom motors and also to reduce stress on the car frame. This is the most efficient configuration with maximum lift and payload capacity.

Variation 2: Flying car with 4 bottom motors and 2 front motors.

In this variation there is reduction in two rear motors. The front motor will have to perform added work of forward and backward movements along with pumping in air for the bottom motors for lift. The reduction in two motors should be compensated with additional air intake grilles on the car body. This is the second best option, this option reduce the over length of the car, reduces the lift power and payload capacity is reduced.

Variation 3: Flying car with 4 bottom motors and 2 rear motors.

In this variation there is reduction in two front motors. The rear motor will primarily assist in forward and backward movement of the car. The reduction in two motors should be compensated with additional air intake grilles on the car body. This is the third best option, this option further reduces the over length of the car, but also reduces the lift and payload capacity further.

Variation 4: Flying car with four bottom motors only without the front and rear motors.

Additional intake grilles in the sides, top and bottom of the car will compensate for the loss of the front and rear motors. The bottom motors will be used for take off, landing as well as forward and backward movements. This is the least best option, this option further provides the shortest car but also reduces the lift and payload capacity and lift drops significantly.

Variation 5: Each of the above variations are available in single passenger and double passenger variation.

L. Operation of Preferred Embodiment

Completely enclosed motors with grilles on the enclosure to prevent contact of the propellers with humans to avoid any injury.

Forward/backward, left/right is controlled by mechanical flaps/rudders on the car. The controller will be one joy stick on the right of the dashboard. The user has full control over this.

Up and down is controlled by aircraft style throttle (left of joy stick).

Speed and brakes are controlled by foot pedals like in a car.

4 wheels, non-powered with connected brakes. Non-retractable.

Batteries spread out across the bottom of the fuselage.

Unless otherwise defined, all technical and scientific terms used herein have the same meaning as commonly understood by one of ordinary skill in the art to which this invention belongs. Although methods and materials similar to or equivalent to those described herein can be used in the practice or testing of the battery operated flying car for human transportation, suitable methods and materials are described above. All publications, patent applications, patents, and other references mentioned herein are incorporated by reference in their entirety to the extent allowed by applicable law and regulations. The battery operated flying car with enclosed motors for human transportation may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

INDEX OF ELEMENTS

10: Bottom Motors
11: Motor
12: Propeller
20: Front Motors
21: Motor
22: Propeller
30: Rear Motors
31: Motor
32: Propeller
40: Airframe
41: Carbon Composite Airframe With Battery Bay And Wheel Attachments.
50: Battery
51: Lithium Polymer Battery
52: Power Control Board
53: Firewall Between The Battery And The Passenger Cabin
54: Heatsink
55: Battery Cooling And Ventilation System
60: Duct Work
61: Low Weight Aluminum Or Plastic Ducts for The Air Intakes.
70: Passenger Cabin
71: Dashboard
72: Console
73: Joystick
74: Throttle
75: Brake Pedal
76: Accelerator Pedal
77: Passenger Seat With Seat Belt
78: Windsheild
79: Doors
80: Avionics
81: Flight Control System
82: Electronic Speed Control System (ESC)
83: Collision Avoidance System With Automatic Wire/rope/string Avoidance.
84: One Touch Take Off And Landing By Touching The Location on A Map in The Console
85: Overload Sensor and Auto Shutoff
86: Power Distribution System
87: Intelligent Orientation Control
88: Multi Rotor Failure Protection
89: Electronic Stability Control With Inertial Measurement Unit
90: Active Noise Reduction system using negative sound waves to reduce the sound from the motor

The invention claimed is:

1. A battery operated flying car with enclosed motors for human transportation that is safe for the passengers and people around the car, comprising:
    an airframe shaped in the form of a car, the airframe having a front, a rear, and a bottom;
    a plurality of bottom motors coupled to the airframe and configured to provide lift and descent of the car;
    a plurality of front motors coupled to the airframe and configured to push air into the airframe for the bottom motors;
    a plurality of rear motors coupled to the airframe and configured to induce a forward and rearward motion on the car;
    a passenger compartment nestled within the airframe;
    a battery source configured to operate each of the motors;
    a front intake air duct located at the front and channeling air into the rear motors; and
    a second air duct located at the rear and extending to the bottom motors;
    wherein each of the motors and propellers are located within at least one of a safety cage and a grille cover to allow the flow of air in and out of the motors but at the same time reduce human injury from exposed propellers.

2. The flying car of claim 1, wherein each motor is a brushless heavy lift motor.

3. The flying car of claim 1, wherein the battery source is centrally located in the airframe beneath the passenger compartment.

4. The flying car of claim 1, wherein the airframe includes wheels.

5. The flying car of claim 4, wherein the wheels are non-retractable.

* * * * *